(12) United States Patent
Daniel et al.

(10) Patent No.: US 6,827,408 B2
(45) Date of Patent: Dec. 7, 2004

(54) SADDLE SUPPORT

(75) Inventors: Patrick Daniel, Kirkel (DE); Rainer Kleber, Sutzbach (DE)

(73) Assignee: INA Schaeffler KG (DE)

( * ) Notice: Subject to any disclaimer, the term of this patent is extended or adjusted under 35 U.S.C. 154(b) by 0 days.

(21) Appl. No.: 10/301,913

(22) Filed: Nov. 22, 2002

(65) Prior Publication Data

US 2003/0102708 A1 Jun. 5, 2003

(30) Foreign Application Priority Data

Dec. 1, 2001 (DE) .......................................... 101 59 141

(51) Int. Cl.$^7$ ............................................. A47B 97/00
(52) U.S. Cl. .................................................. 297/463.1
(58) Field of Search ........................... 297/195.1, 463.1; 280/281.1; 267/131, 132; 248/560, 158, 219.4

(56) References Cited

U.S. PATENT DOCUMENTS 6,186,487 B1 * 2/2001 Kesinger

FOREIGN PATENT DOCUMENTS

CH 660574 * 5/1987

* cited by examiner

Primary Examiner—Milton Nelson, Jr.
(74) Attorney, Agent, or Firm—Muserlian, Lucas and Mercanti

(57) ABSTRACT

A saddle support for securing a saddle of a vehicle, typically of a bicycle, comprises an outer part (2) that surrounds at least a portion of an inner part (1) with formation of a gap (8). A rolling bearing for a linear mounting of the inner part (1) on the outer part (2) is arranged in this gap (8). A spring element (5) acting in mounting direction spring-mounts the inner part (1). The rolling bearing is constituted by a linear bearing assembly (9) with recirculating rolling elements. The rolling elements (13) are in rolling contact with rolling element raceways (13a, 15, 14), at least one of said rolling element raceways being configured on the linear bearing assembly (9) and at least one other of said rolling element raceways being configured on the inner part (1).

9 Claims, 2 Drawing Sheets

SADDLE SUPPORT

BACKGROUND OF THE INVENTION

The invention concerns a saddle support for securing a saddle of a vehicle, typically of a bicycle; said saddle support comprising an outer part that surrounds at least a portion of an inner part with formation of a gap, which inner part receives the saddle, a rolling bearing for a linear mounting of the inner part on the outer part being arranged in the gap, and the support further comprising a spring element acting in mounting direction for spring-mounting the inner part.

With a view to improving comfort, bicycles having spring-mounted and cushioned saddles are being offered for sale for some time past. Shocks introduced into the bicycle frame due to unevenness of the roadway are thus not transmitted directly into the saddle but are rather mitigated and damped. A saddle support known from DE 201 02 011 U1, for example, comprises an inner tube and an outer tube both having an annular cross section. The outer diameter of the inner tube is smaller than the inner diameter of the outer tube. The outer tube surrounds a portion of the inner tube with formation of an annular gap. Balls arranged in the gap enable a relative linear motion between the inner and the outer tube. It is also possible to use rollers or other rolling elements in place of the balls. The balls are guided with the help of raceway plates that are inserted into the inner or the outer tube and comprise cavities extending in an axial direction. Two raceway plates are arranged at an offset of 160° to each other on the inner peripheral surface of the outer tube, so that the inner tube is perfectly mounted linearly on the outer tube. A drawback of this prior art rolling bearing is that only a limited length of travel is possible The limit of travel is reached when the balls or other rolling elements reach the end of the raceway plates. A further drawback is to be seen in the fact that due to vibrations during operation and under the action of gravity, the balls slip gradually downwards so that a satisfactory displacement is no longer guaranteed.

OBJECTS OF THE INVENTION

It is an object of the invention to provide an improved saddle support of the pre-cited type which guarantees a perfect mounting of the inner part on the outer part.

This and other objects and advantages of the invention will become obvious from the following detailed description.

SUMMARY OF THE INVENTION

The invention achieves the above objects by the fact that the rolling bearing is a linear bearing assembly with recirculation of rolling elements which are in rolling contact with rolling element raceways, at least one of said rolling element raceways being configured on the linear bearing assembly and at least one other of said rolling element raceways being configured on the inner part. An important advantage of the saddle support of the invention is that a theoretically unlimited length of travel is possible. Linear bearing assemblies with recirculation of rolling elements have been known, per se, for a long time. Due to their compact structure, and in conjunction with necessary modifications to the inner tube and the outer tube, they can make a substantial contribution to enhancing comfort For example, with the saddle support of the invention it is possible without any problem, to use springs with differently dimensioned spring excursions without having to match the spring excursion to the maximum travel length of the rolling bearing. Besides this, no measures are required on the outer part for configuring a rolling element raceway because a raceway is already provided on the linear bearing assembly.

The preferably tubular outer part may comprise a reception in which the linear bearing assembly is fixed. The reception can be formed, for instance by making a step in the tubular outer part and delimiting this step at an inner axial end by a shoulder. The linear bearing assembly can then be pressed, for example, into the reception without any problem till it comes to abut against the shoulder and thus reaches its final position.

The inner part may be constituted by a tube having a smooth, cylindrical outer peripheral surface which then directly forms the rolling element raceway. In this case, so-called recirculating linear ball bearings are particularly suited as linear bearing assemblies that enable a return of the rolling elements because such recirculating linear ball bearings are likewise suitable for torque transmission even if, as is the case here, the shaft has a smooth, cylindrical outer peripheral surface. The rolling elements in the present embodiment are balls that are in rolling contact with the cylindrical outer peripheral surface. In another embodiment of the invention, ball grooves are made in an axial direction in the cylindrical outer peripheral surface of the inner part and the balls are in rolling contact with these ball grooves. In this embodiment a perfect transmission of torque is guaranteed due to the configuration of the raceway as a ball groove In this case, too, recirculating linear ball bearings are particularly suited.

Such recirculating linear ball bearings preferably comprise an outer bushing that can be pressed into the initially mentioned reception of the outer part. The saddle support of the invention can therefore be manufactured in a very simple manner. To keep a momental loading about an axis perpendicular to the longitudinal axis as low as possible in the linear bearing assembly with recirculation of rolling elements, two linear bearing assemblies spaced apart in axial direction are provided in another embodiment of the invention.

The invention will now be described more closely with reference to two embodiments illustrated in the four appended drawings.

DETAILED DESCRIPTION OF THE DRAWINGS

Figure 1:
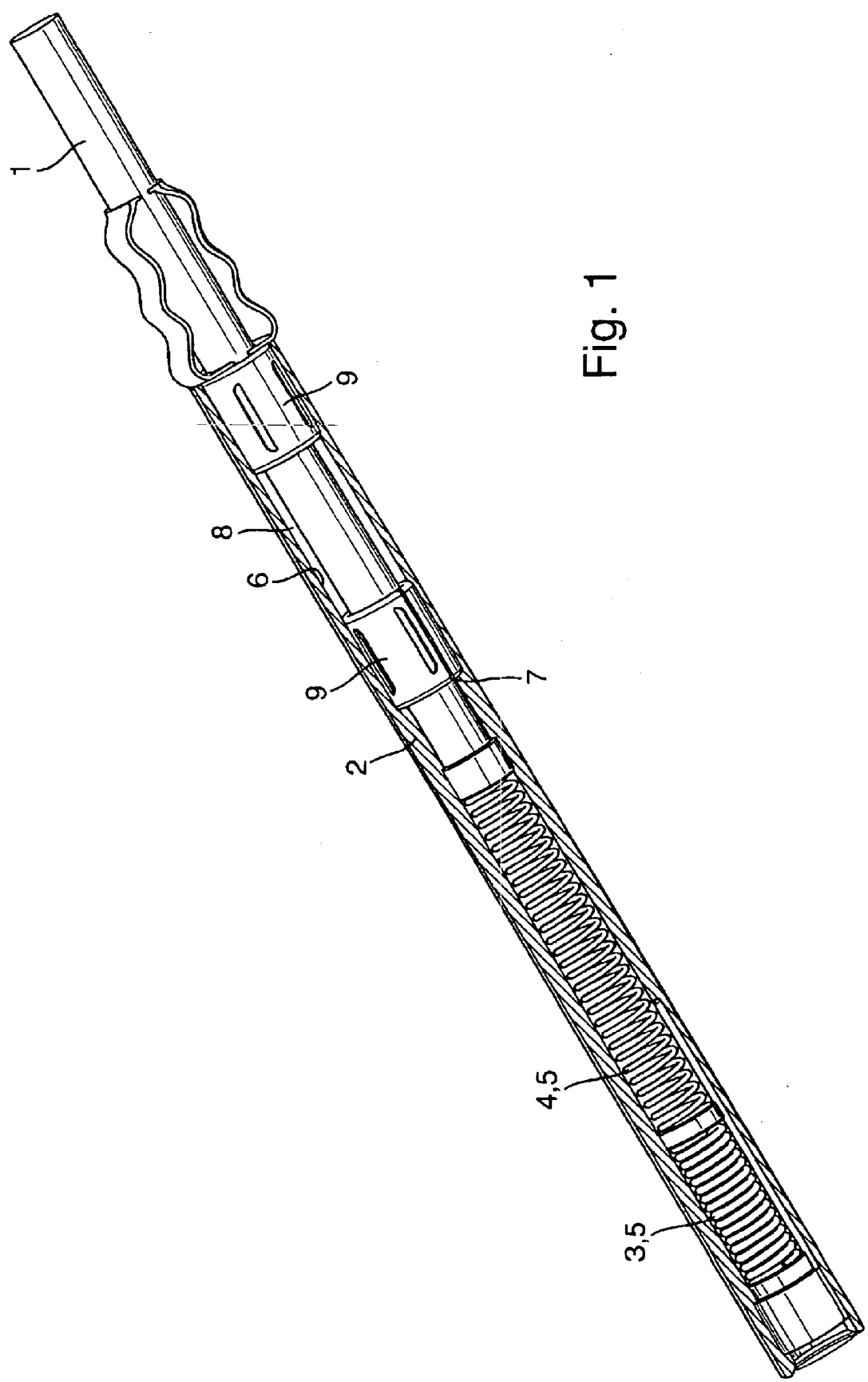
FIG. 1 is a longitudinal section through a saddle support of the invention.
Figure 2:
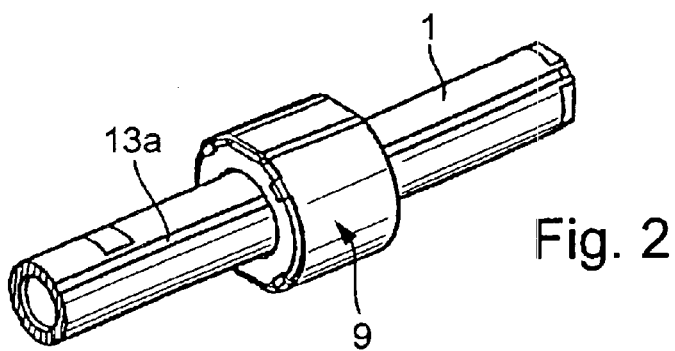
FIG. 2 shows a portion of tho saddle support of FIG. 1 in a perspective representation.
Figure 3:
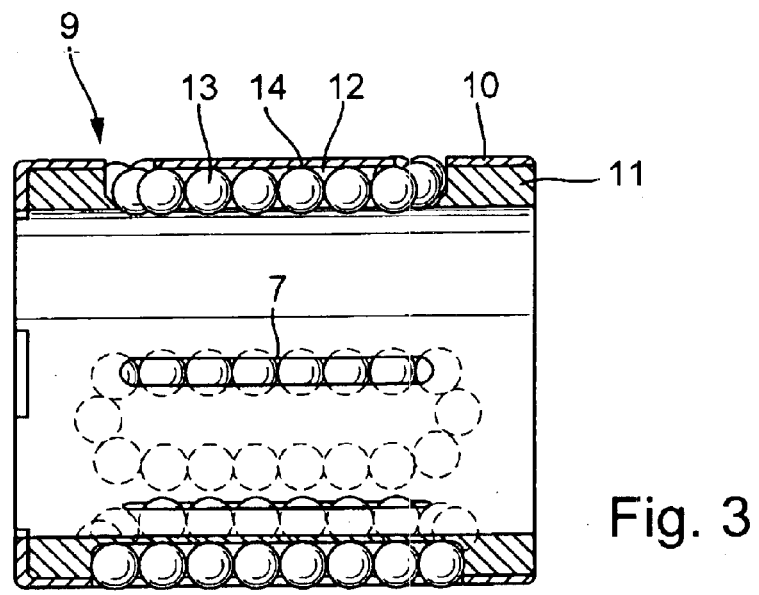
FIG. 3 is a longitudinal section through the saddle support of FIG. 2.

The saddle support of the invention shown in FIGS. 1, 2, 3 comprises an inner tube 1 that is inserted into an outer tube 2. A saddle, not shown, is fixed to the upper end of the inner tube 1. The outer tube 2 can be inserted into and clamped in the usual manner to the saddle tube, not shown, of the bicycle. Two coil compression springs 3 and 4 of different spring stiffness are arranged axially behind each other within the outer tube 2. Through the proposed row arrangement of the coil compression springs 3, 4, a progressive characteristic curve of the spring system is obtained. This spring element 5 formed by the coil compression springs 3, 4 is supported at one end on the outer tube 2 and bears resiliently in axial direction at the other end against the inner tube 1. A step 6 made in the outer tube 2 is delimited in axial direction by a shoulder 7. Two axially spaced recirculating linear ball bearings 9 are arranged in the annular gap 8 defined by the step 6 and the inner tube 1. The recirculating linear bell bearing 9 situated further inward is inserted or pressed into the step 6 till it comes to abut against and be sealed on the shoulder 7. In the present embodiment, the recirculating linear ball bearing 9 situated at the tube entrance is pressed into the step 6 till its axial end comes to be situated approximately in the same plane as the axial end of the outer tube 2.

The recirculating linear ball bearing 9 comprises a bushing 10 in which a cage 11 is arranged. The cage 11 is provided in a known manner with groove 12 for ball recirculation. Balls 13 are arranged in the grooves 12. During a complete ball circulation, every ball 13 travels through a load-bearing section in which it rolls on a ball groove 13a of the inner tube 1 and on a ball groove 14 of the bushing 10. The ball groove 14 is made on the inner peripheral surface of the bushing 10. The ball groove 13a extends in axial direction in the outer peripheral surface of the inner tube 1. Advantageously, the inner tube 1 comprises a plurality of ball grooves 13a distributed over its periphery. In a return section, the balls 13 roll in the groove 12 of the cage 11 and engage with a part of their periphery into recesses 15 made in the bushing 10.

Figure 4:
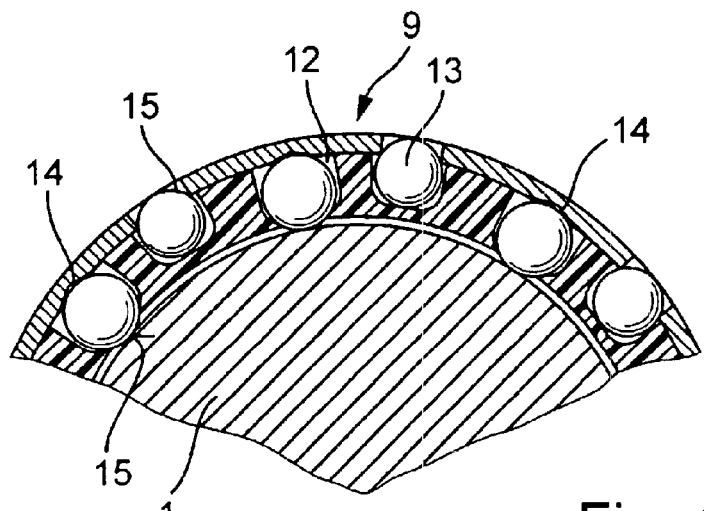
FIG. 4 is a cross-section through the saddle support of FIG. 3, but having a modified inner tube.

Differently from FIG. 2, FIG. 4 shows an inner tube 1 having a smooth cylindrical outer peripheral surface. Thus, in the load-bearing section, the balls 13 roll directly on the cylindrical outer peripheral surface of the inner tube 1. The cylindrical outer peripheral surface of the inner tube 1 thus also forms a rolling element raceway 15 for the balls 13. The relative displacement between the inner tube 1 and the outer tube 2 is limited by the spring excursion of the spring element 5 or by the telescopic arrangement of the tubes 1, 2 but not by the recirculating linear ball bearings 9 that permit an unlimited displacement.

What is claimed is:

1. A saddle support for securing a saddle of a vehicle, said saddle support comprising an outer part that surrounds at least a portion of an inner part with formation of a gap, which inner part is adapted to the saddle, a ball bearing for a linear mounting on the inner part of the outer part being arranged in the gap, and the support further comprises a spring element in a mounting direction for spring-mounting the inner part, wherein the ball bearing is a linear bearing assembly with recirculation of ball elements which are in rolling contact with ball element raceways, at least one of said ball element raceways being configured on the linear bearing assembly and at least one other of said ball element raceways being configured on the inner part whereby the path of the ball elements is endless and is comprised of load bearing section, a load free section and a deflecting section inter-connecting the load bearing and load free sections.

2. A saddle support of claim 1, wherein inner part is fixed in a reception of the outer part.

3. A saddle support of claim 1, wherein the inner part possesses a cylindrical outer peripheral surface.

4. A saddle support of claim 3, wherein the ball element raceway made on the inner part is defined directly by the cylindrical outer peripheral surface.

5. A saddle support of claim 3, wherein the ball element raceway made on the inner part is defined by a ball groove formed into the cylindrical outer peripheral surface, with which groove, ball elements are in rolling contact.

6. A saddle support of claim 1, wherein the outer part has a tubular configuration and the inner part is arranged in the outer part so that an annular gap is formed between the inner part and the outer part, in which annular gap the linear bearing assembly is received.

7. A saddle support of claim 1, wherein the linear bearing assembly is formed by a recirculating linear ball bearing.

8. A saddle support of claim 7, wherein the recirculating linear ball bearing comprises an outer bushing that is pressed into a reception of the outer part.

9. A saddle support of claim 1, wherein two linear bearing assemblies are arranged at an axial distance from each other in the mounting direction.

\* \* \* \* \*